(12) United States Patent
Kashiwagi et al.

(10) Patent No.: US 6,182,805 B1
(45) Date of Patent: Feb. 6, 2001

(54) DAMPING FORCE CONTROL TYPE HYDRAULIC SHOCK ABSORBER

(75) Inventors: Akira Kashiwagi; Nobuyuki Ichimaru; Akinori Kurusu, all of Kanagawa-ken (JP)

(73) Assignee: Tokico Ltd., Kawasaki (JP)

(*) Notice: Under 35 U.S.C. 154(b), the term of this patent shall be extended for 0 days.

(21) Appl. No.: 09/339,832

(22) Filed: Jun. 25, 1999

(30) Foreign Application Priority Data

Jun. 26, 1998 (JP) .................................................. 10-196783
Dec. 28, 1998 (JP) .................................................. 10-372923

(51) Int. Cl.$^7$ ..................................................... F16F 9/34
(52) U.S. Cl. .................. 188/266.6; 188/318; 188/322.13
(58) Field of Search ............................... 188/266.2, 266.5, 188/266.6, 282.1, 282.2, 282.3, 282.4, 282.5, 282.6, 282.8, 313, 316, 317, 318, 319.1, 322.13; 267/140.14, 140.15; 137/599.01

(56) References Cited

U.S. PATENT DOCUMENTS

| | | | |
|---|---|---|---|
| 4,802,561 | 2/1989 | Knecht et al. | 188/318 |
| 5,586,627 | 12/1996 | Nezu et al. | 188/318 |
| 5,934,421 | * 8/1999 | Nakadate et al. | 188/318 |
| 5,960,915 | * 10/1999 | Nezu et al. | 188/266.6 |
| 6,079,526 | * 6/2000 | Nezu et al. | 188/266.6 |

FOREIGN PATENT DOCUMENTS 7-139575  5/1995  (JP) .

* cited by examiner

Primary Examiner—Robert J. Oberleitner
Assistant Examiner—Thomas J. Williams
(74) Attorney, Agent, or Firm—Wenderoth, Lind & Ponack, L.L.P.

(57) ABSTRACT

The flow of a hydraulic fluid caused by sliding movement of a piston is controlled through a sub-disk valve, a main disk valve and a disk valve to generate damping force. A coil is energized to urge a plunger in the valve closing direction against spring force from a spring, thereby adjusting the relief pressure of the disk valve and thus controlling the damping force. The pressure in a back-pressure chamber varies according to the relief pressure of the disk valve. Thus, the valve opening pressure of the main disk valve is also adjusted. An abrupt input is absorbed by relieving the pressure from the back-pressure chamber by deflection of the disk valve. Because "soft" damping force characteristics, which are often used, are maintained with a small electric current, the power consumption can be reduced. When there is a failure, the spring causes the small-diameter portion of the plunger to close ports, thereby switching the damping force to "hard" side and thus ensuring the steering stability.

10 Claims, 7 Drawing Sheets

DAMPING FORCE CONTROL TYPE HYDRAULIC SHOCK ABSORBER

BACKGROUND OF THE INVENTION

The present invention relates to a damping force control type hydraulic shock absorber attached to a suspension system of a vehicle, for example, an automobile.

Hydraulic shock absorbers attached to suspension systems of automobiles or other vehicles include damping force control type hydraulic shock absorbers which are designed so that the level of damping force can be appropriately controlled in accordance with the road surface conditions, vehicle running conditions, etc. with a view to improving the ride quality and the steering stability.

In general, this type of hydraulic shock absorber includes a cylinder having a hydraulic fluid sealed therein. A piston, which has a piston rod connected thereto to constitute a piston assembly, is slidably fitted in the cylinder to divide the inside of the cylinder into two chambers. The piston assembly is provided with a main hydraulic fluid passage and a bypass passage, which provide communication between the two chambers in the cylinder. The main hydraulic fluid passage is provided with a damping force generating mechanism including an orifice and a disk valve. The bypass passage is provided with a damping force control valve for controlling the flow path area of the bypass passage.

When the bypass passage is opened through the damping force control valve, the flow resistance to the hydraulic fluid flowing between the two chambers in the cylinder is reduced, thereby reducing damping force. When the bypass passage is closed, the flow resistance between the two chambers is increased, thereby increasing damping force. Thus, damping force characteristics can be appropriately controlled by opening and closing the damping force control valve.

In the above-described damping force control type hydraulic shock absorber, in which damping force is controlled by changing the flow path area of the bypass passage, the damping force characteristics can be changed to a considerable extent in the low piston speed region because damping force in this region depends on the restriction by the orifice in the hydraulic fluid passage. However, the damping force characteristics cannot greatly be changed in the intermediate and high piston speed regions because in these regions damping force depends on the degree of opening of the damping force generating mechanism (disk valve, etc.) in the main hydraulic fluid passage.

To solve the above-described problem, Japanese Patent Application Unexamined Publication (KOKAI) No. 62-220728, for example, discloses a damping force control type hydraulic shock absorber in which a pressure chamber (pilot chamber) is formed at the back of a disk valve serving as a damping force generating mechanism in a main hydraulic fluid passage common to the extension and contraction sides, and the pressure chamber is communicated with a cylinder chamber on the upstream side of the disk valve through a fixed orifice and also communicated with a cylinder chamber on the downstream side of the disk valve through a variable orifice (flow control valve).

According to the above damping force control type hydraulic shock absorber, the flow path area of the passage between the two chambers in the cylinder is controlled by opening and closing the variable orifice, and the valve opening initial pressure of the disk valve can be varied by changing the pressure in the pressure chamber by the pressure loss in the variable orifice. Thus, it is possible to control orifice characteristics (in which damping force is approximately proportional to the square of the piston speed) and valve characteristics (in which damping force is approximately proportional to the piston speed), and hence possible to widen the control range for damping force characteristics.

There is another type of damping force control type hydraulic shock absorber in which damping force is controlled by opening and closing a damping force control valve according to the magnitude of energizing electric current using a solenoid actuator or the like. In this type of damping force control type hydraulic shock absorber, in general, the degree of opening of the damping force control valve is controlled by moving the valving element of the valve in the valve opening direction with thrust from the solenoid actuator against urging force from a spring member that constantly urges the valving element in the valve closing direction. Thus, when no electric current is supplied to the solenoid, the damping force control valve is closed. Therefore, in a case where the solenoid cannot be energized owing to a failure in the electric system or the like, the damping force characteristics are fixed to the "hard"0 side, and thus the steering stability of the vehicle can be ensured.

However, the above-described conventional damping force control type hydraulic shock absorbers suffer from the following problems.

In the damping force control type hydraulic shock absorber disclosed in Japanese Patent Application Unexamined Publication (KOKAI) No. 62-220728, damping force is controlled by the flow rate control through the variable orifice. Therefore, damping force actually generated changes according to the piston speed. For this reason, when there is an abrupt input due to thrusting-up force applied to the vehicle from the road surface, for example, damping force increases rapidly as the piston speed rises, and shock is transmitted to the vehicle body. This may cause the ride quality to be degraded. Moreover, the flow resistance of the variable orifice varies to a considerable extent according to the viscosity of the hydraulic fluid. Therefore, the effect of temperature changes on the damping force characteristics is unfavorably large. Accordingly, stable damping force characteristics cannot be obtained with the variable orifice.

The damping force control type hydraulic shock absorber in which the damping force control valve is opened by thrust from the solenoid actuator against urging force from the spring member involves the following problem. In general, "soft" damping force characteristics are often used under the normal running conditions of vehicles. Therefore, the frequency with which a large electric current is supplied to the solenoid to maintain the "soft" damping force characteristics is high. Accordingly, the power consumption increases, and the load on the solenoid is unfavorably heavy.

SUMMARY OF THE INVENTION

In view of the above-described circumstances, an object of the present invention is to provide a damping force control type hydraulic shock absorber which has a wide damping force characteristic control range and is capable of directly controlling damping force independently of the piston speed with a minimal effect of temperature changes on the damping force characteristics, and which is also capable of appropriately absorbing an abrupt input and yet reducing the power consumption and obtaining "hard" damping force characteristics when there is a failure.

To attain the above-described object, the present invention provides a damping force control type hydraulic shock absorber including a cylinder having a hydraulic fluid sealed therein. A piston is slidably fitted in the cylinder. A piston rod is connected at one end thereof to the piston. The other end of the piston rod extends to the outside of the cylinder. A main hydraulic fluid passage and a sub-hydraulic fluid passage are connected to the cylinder to pass the hydraulic fluid in response to sliding movement of the piston. A pilot-type damping valve is provided in the main hydraulic fluid passage. A fixed orifice and a pressure control valve are provided in the sub-hydraulic fluid passage. The pressure between the fixed orifice and the pressure control valve in the sub-hydraulic fluid passage is used as a pilot pressure of the pilot-type damping valve.

The pressure control valve is a solenoid-controlled valve in which a valving element constantly urged in the valve opening direction by an urging member is urged in the valve closing direction by thrust from a solenoid to control the flow path area of the sub-hydraulic fluid passage by a balance between urging force from the urging member and the thrust from the solenoid, thereby adjusting the pilot pressure. In addition, a fail-safe valve is provided in the sub-hydraulic fluid passage. The fail-safe valve is opened by thrust from the solenoid. When the thrust from the solenoid is less than a predetermined level, the fail-safe valve restricts the sub-hydraulic fluid passage by the urging force from the urging member.

With the above-described arrangement, damping force before the pilot-type damping valve opens is directly controlled by controlling the degree of opening of the valving element with the thrust from the solenoid. In addition, the valve opening pressure of the pilot-type damping valve is controlled by varying the pilot pressure through the pressure control valve. At this time, when the electric current supplied to the solenoid is small, the resulting damping force is small, whereas when the supplied electric current is large, the resulting damping force is large. When there is no supply of electric current, the fail-safe valve restricts the sub-hydraulic fluid passage to increase the damping force.

In the present invention, the valving element of the pressure control valve may be a disk valve.

By virtue of the above-described arrangement, an abrupt rise in pressure of the hydraulic fluid can be relieved by deflection of the disk valve.

In the present invention, the arrangement may be such that when the fail-safe valve is opened, the valving element of the fail-safe valve is urged toward the valve opening position by the pressure of the hydraulic fluid, and when the fail-safe valve is closed, the valving element of the fail-safe valve is urged toward the valve closing position by the pressure of the hydraulic fluid.

By virtue of the above-described arrangement, it is possible to reduce the urging force applied to the valving element of the fail-safe valve by a spring or the like.

DETAILED DESCRIPTION OF THE INVENTION

Embodiments of the present invention will be described below in detail with reference to the accompanying drawings.

A first embodiment will be described with reference to FIGS. 1 to 8.

Figure 2:
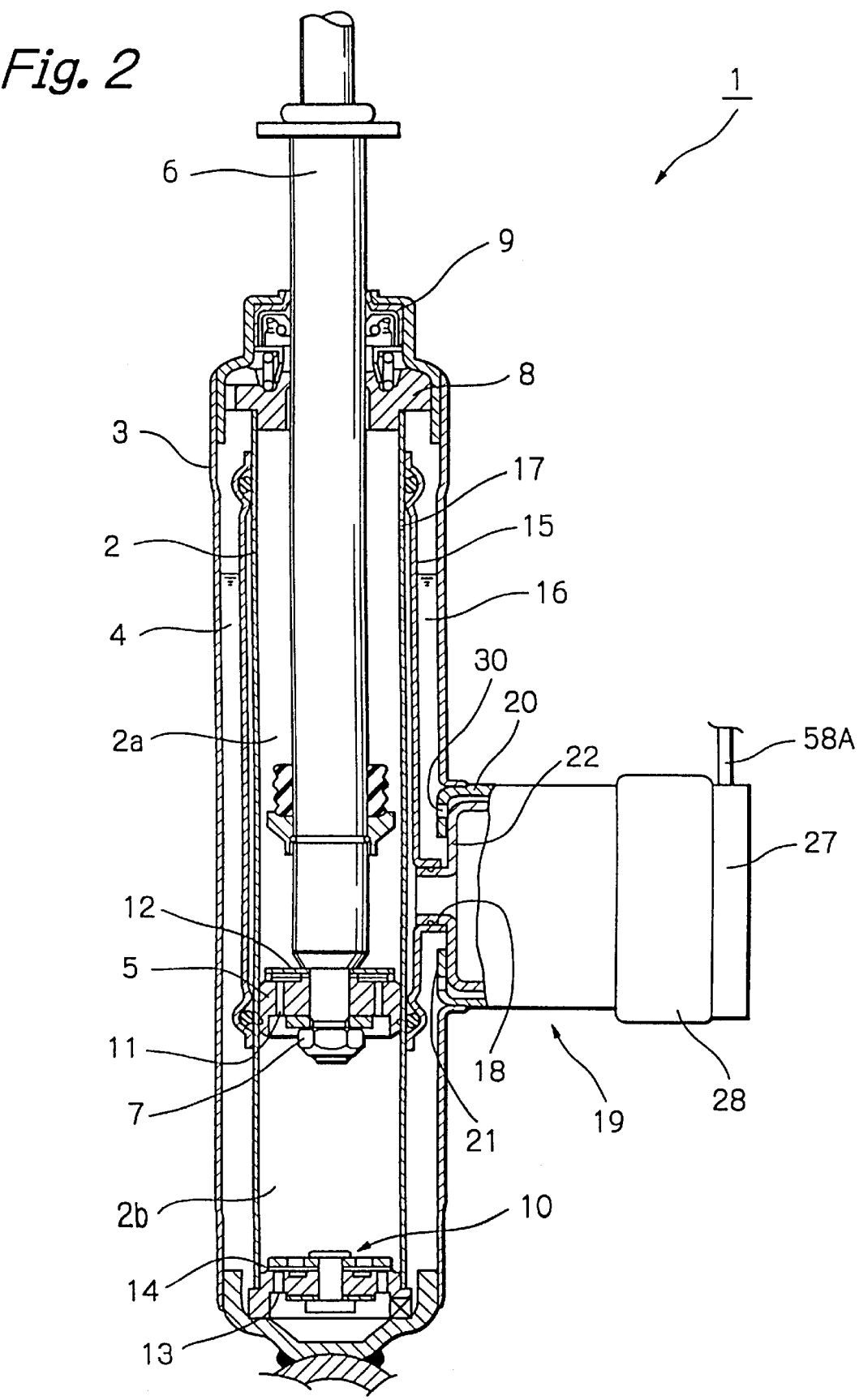
FIG. 2 is a vertical sectional view of the damping force control type hydraulic shock absorber according to the first embodiment of the present invention.

As shown in FIG. 2, a damping force control type hydraulic shock absorber 1 according to this embodiment has a double-cylinder structure comprising a cylinder 2 and an outer cylinder 3 provided outside the cylinder 2. A reservoir 4 is formed between the cylinder 2 and the outer cylinder 3. A piston 5 is slidably fitted in the cylinder 2. The piston 5 divides the inside of the cylinder 2 into two chambers, i.e. a cylinder upper chamber 2a and a cylinder lower chamber 2b. The piston 5 is connected with one end of a piston rod 6 by a nut 7. The other end portion of the piston rod 6 extends through the cylinder upper chamber 2a and further through a rod guide 8 and an oil seal 9, which are fitted to the upper end portion of the double-cylinder structure comprising the cylinder 2 and the outer cylinder 3, and projects to the outside of the cylinder 2. A base valve 10 is provided in the lower end portion of the cylinder 2 to divide the cylinder lower chamber 2b and the reservoir 4 from each other.

The piston 5 is provided with a hydraulic fluid passage 11 for communication between the cylinder upper and lower chambers 2a and 2b. The piston 5 is further provided with a check valve 12 that allows the hydraulic fluid to flow through the hydraulic fluid passage 11 in only one direction from the cylinder lower chamber 2b toward the cylinder upper chamber 2a. The base valve 10 is provided with a hydraulic fluid passage 13 for communication between the cylinder lower chamber 2b and the reservoir 4. The base valve 10 is further provided with a check valve 14 that allows the hydraulic fluid to flow through the hydraulic fluid passage 13 in only one direction from the reservoir 4 toward the cylinder lower chamber 2b. The cylinder 2 has a hydraulic fluid sealed therein, and the reservoir 4 has the hydraulic fluid sealed therein, together with a gas sealed under a predetermined pressure.

An outer tube 15 is fitted over the cylinder 2. An annular hydraulic fluid passage 16 is formed between the cylinder 2 and the outer tube 15. The annular hydraulic fluid passage 16 is communicated with the cylinder upper chamber 2a through a hydraulic fluid passage 17 provided in a side wall of the cylinder 2 near the upper end thereof. An opening 18 is formed in a side wall of the outer tube 15. A damping force generating mechanism 19 is attached to a side surface portion of the outer cylinder 3.

Figure 1:
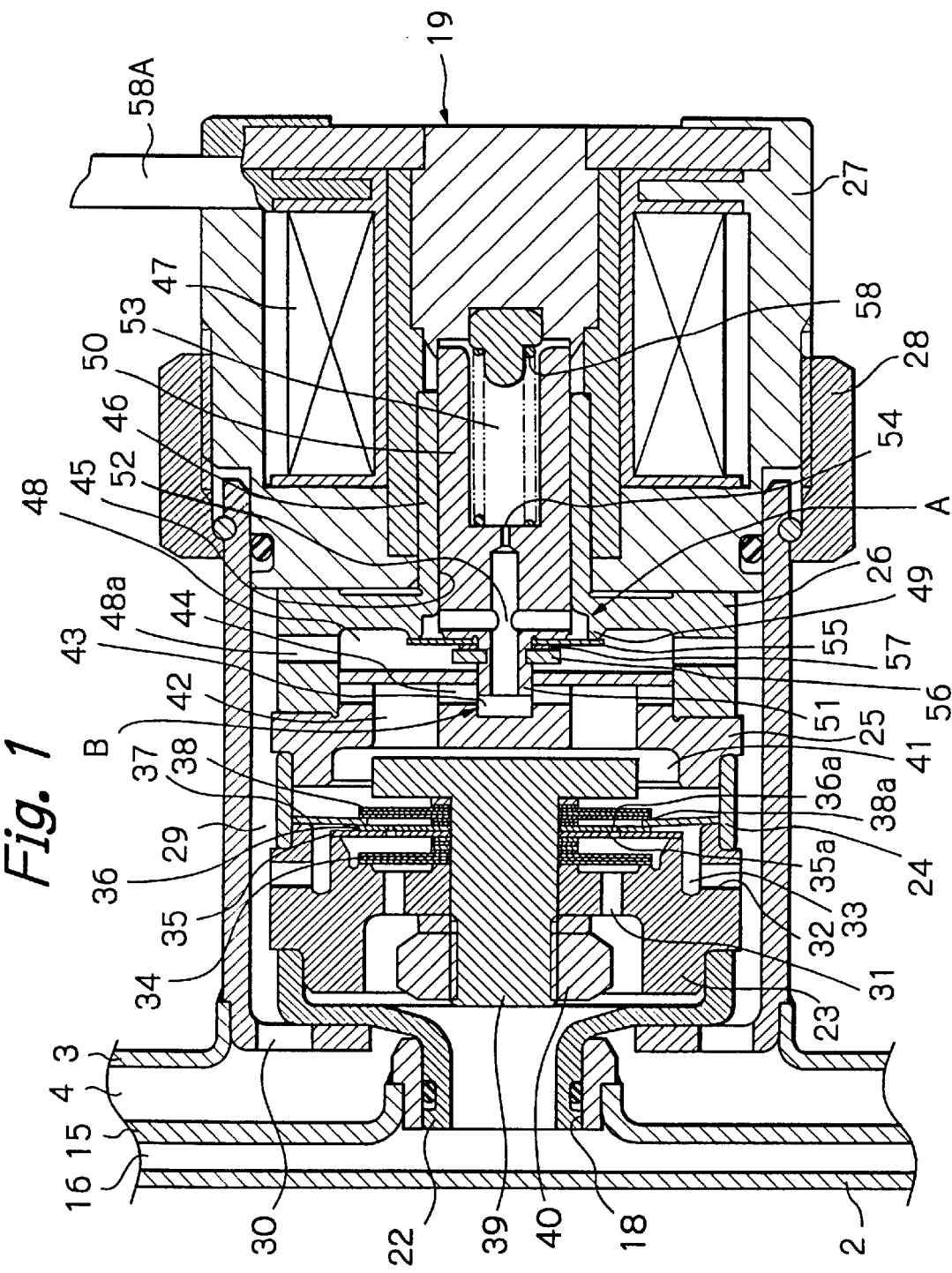
FIG. 1 is an enlarged vertical sectional view showing a damping force generating mechanism of a damping force control type hydraulic shock absorber according to a first embodiment of the present invention.

Next, the damping force generating mechanism 19 will be described with reference to mainly FIG. 1. As shown in FIG. 1, a cylindrical casing 20 has a flange 21 formed at one end thereof to define an opening. The open end portion of the casing 20 is welded to a side wall of the outer cylinder 3. The casing 20 contains, in order from the flange (21) side thereof, a passage member 22, a valve member 23, a cylindrical member 24, a fail-safe valve member 25 and a pilot valve member 26, which are inserted in the casing 20 in such a manner as to abut on one another. A proportional solenoid control part 27 is attached to the other end portion of the casing 20 by a nut 28. The proportional solenoid control part 27 abuts on the pilot valve member 26 to secure the passage member 22, the valve member 23, the cylindrical member 24, the fail-safe valve member 25 and the pilot valve member 26. An annular hydraulic fluid chamber 29 is formed between the casing 20 and the respective outer peripheral portions of the passage member 22, the valve member 23, the cylindrical member 24, the fail-safe valve member 25 and the pilot valve member 26. The annular hydraulic fluid chamber 29 is communicated with the reservoir 4 through a hydraulic fluid passage 30 provided in the flange 21.

The valve member 23 is provided with hydraulic fluid passages 31 and 32 and an annular groove 33, which provide communication between the passage member 22 and the annular hydraulic fluid chamber 29. The valve member 23 has a sub-disk valve 34, a main disk valve 35 (pilot-type damping valve), a spacer disk 36, a seal ring 37 and a disk-shaped plate spring 38, which are mounted thereon by a pin 39 and a nut 40. The sub-disk valve 34 and the main disk valve 35 are each adapted to open by lifting at the outer peripheral portion thereof and control the flow of the hydraulic fluid from the hydraulic fluid passage 31 toward the annular groove 33 according to the degree of opening of the valve, thereby generating damping force. The spacer disk 36 and the seal ring 37 are pressed on the back of the main disk valve 35 by the plate spring 38 to form a back-pressure chamber 41 between them and the fail-safe valve member 25. Thus, the pressure in the back-pressure chamber 41 acts on the main disk valve 35 in the direction for closing the valve 35.

The main disk valve 35 is provided with a fixed orifice 35a. The fixed orifice 35a is communicated with the back-pressure chamber 41 through a hydraulic fluid passage 36a in the spacer disk 36 and a cut portion 38a formed in the outer peripheral portion of the plate spring 38.

Figure 5:
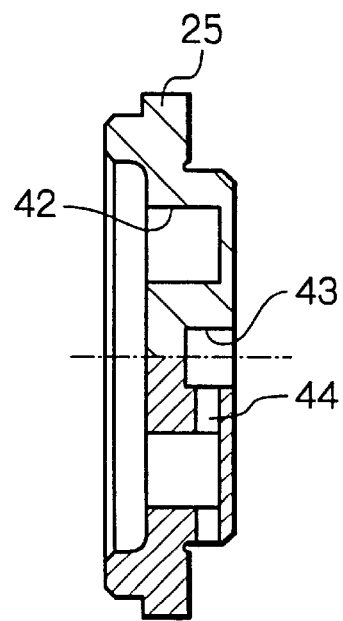
FIG. 5 is a sectional view of a fail-safe valve member in the damping force generating mechanism shown in FIG. 1, taken along the line A—A in FIG. 6.
Figure 6:
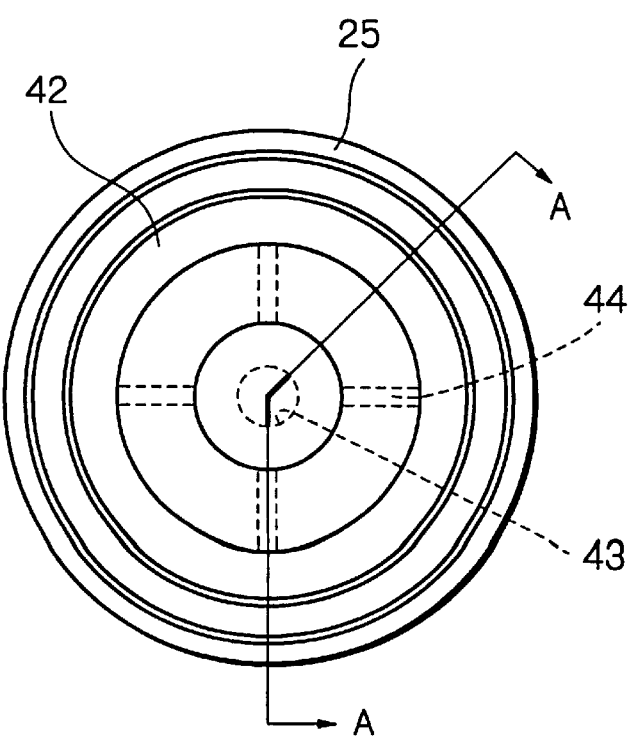
FIG. 6 is a front view of the fail-safe valve member in the damping force generating mechanism shown in FIG. 1.

As shown in FIGS. 5 and 6, the fail-safe valve member 25 has an annular groove 42 formed on one end thereof that faces the back-pressure chamber 41. A guide hole 43 is formed in the center on the other end of the fail-safe valve member 25. The annular groove 42 and the guide hole 43 are communicated with each other through a plurality of radially extending ports 44. The pilot valve member 26 has a cylindrical portion 46 that has a guide bore 45 facing the guide hole 43 of the fail-safe valve member 25. The distal end of the cylindrical portion 46 is inserted into the center of a coil 47 (solenoid) of the proportional solenoid control part 27. An annular valve seat 49 projects around the opening of the guide bore 45 on an end surface of the pilot valve member 26 that forms a hydraulic fluid chamber 48 between it and the fail-safe valve member 25. The hydraulic fluid chamber 48 is communicated with the annular hydraulic fluid chamber 29 through a hydraulic fluid passage 48a provided in the pilot valve member 26.

A plunger 50 is slidably fitted in the guide bore 45 of the pilot valve member 26. The plunger 50 has a small-diameter portion 51 formed at one end thereof. The small-diameter portion 51 is slidably fitted in the guide hole 43 of the fail-safe valve member 25. The plunger 50 is guided by the guide bore 45 and the guide hole 43 so as to be movable forward and backward along them. The plunger 50 is provided with a communicating passage 52. One end of the communicating passage 52 opens at the distal end of the small-diameter portion 51. The communicating passage 52 extends axially and radially through the plunger 50. The other end of the communicating passage 52 opens at the side surface of a large-diameter portion of the plunger 50. The communicating passage 52 provides communication between the inside of the guide hole 43 and the inside of the valve seat 49 that is communicated with the guide bore 45. The plunger 50 is further provided with a restriction passage 54 that provides communication between the communicating passage 52 and a hydraulic fluid chamber 53 formed at the back of the plunger 50, thereby balancing pressures acting on both ends of the plunger 50 with each other and also applying appropriate damping force to the movement of the plunger 50.

The plunger 50 has a disk valve 55 (valving element) mounted on a step portion from which the small-diameter portion 51 projects. The disk valve 55 is adapted to rest on the valve seat 49. The disk valve 55 is pierced with the small-diameter portion 51 and secured by a retainer 56 and a spacer 57, which are fitted on the small-diameter portion 51.

The plunger 50 is urged toward the guide hole 43 by a spring 58 (urging member) provided in the chamber 53, which is formed at the back of the plunger 50. That is, the plunger 50 is urged in a direction in which the disk valve 55 mounted on the plunger 50 separates from the valve seat 49. The valve seat 49, the plunger 50 and the disk valve 55 constitute a pressure control valve A. When the coil 47 is energized through a lead wire 58A, thrust is produced in a direction in which the plunger 50 is moved backward against the spring force of the spring 58, causing the disk valve 55 to rest on the valve seat 49. The valve opening pressure of the disk valve 55 is determined by the balance between the thrust and the spring force of the spring 58. Thus, the control pressure (relief pressure) of the pressure control valve A can be adjusted according to the electric current supplied to the coil 47.

Figure 3:
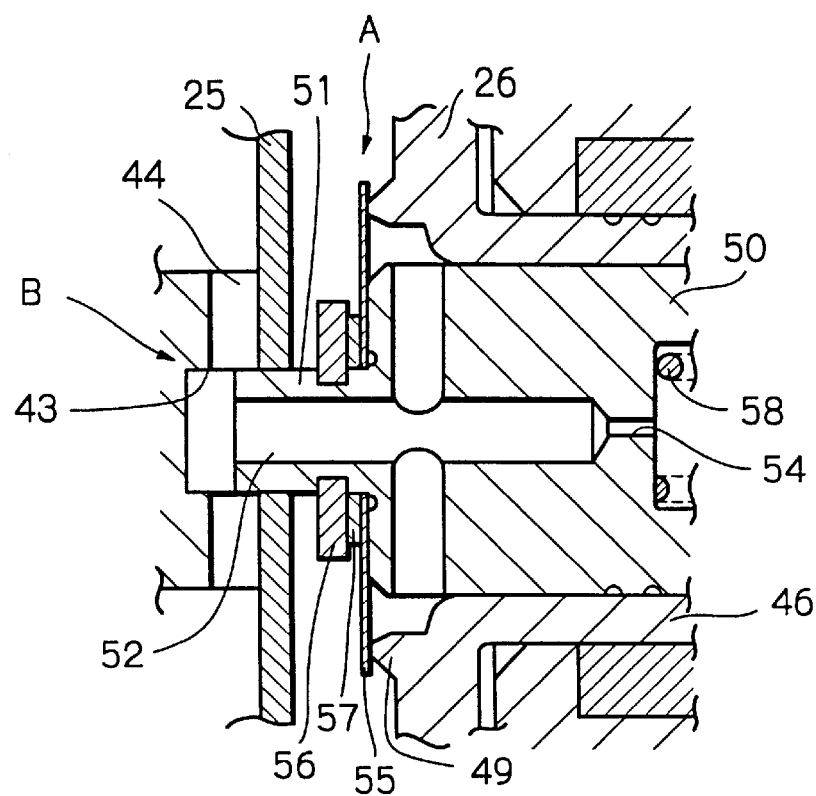
FIG. 3 is an enlarged view of a pressure control valve and fail-safe valve in the damping force generating mechanism shown in FIG. 1 when a coil of a solenoid control part is energized.
Figure 4:
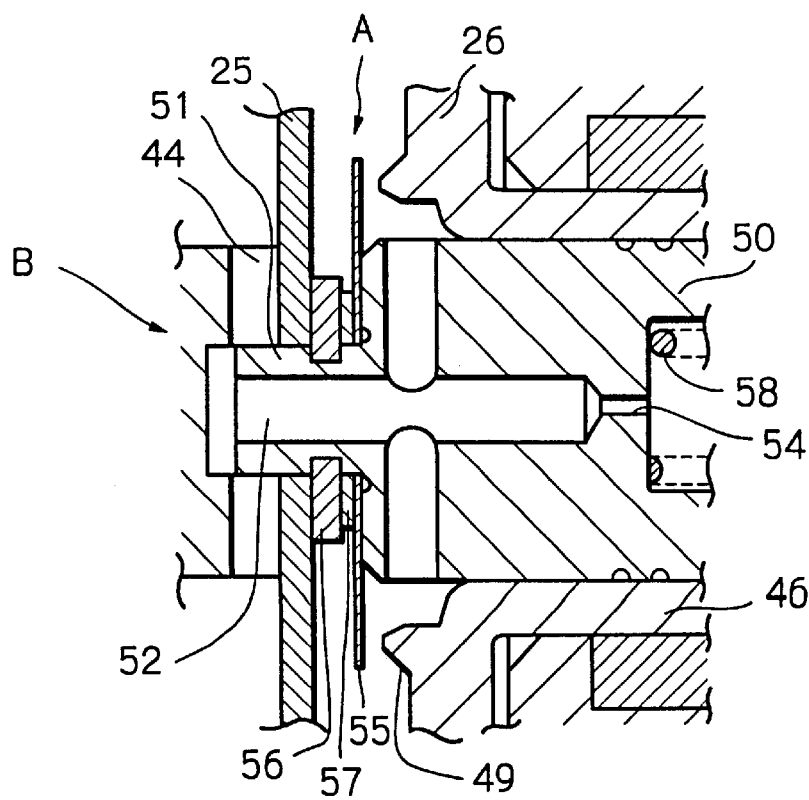
FIG. 4 is an enlarged view of the pressure control valve and fail-safe valve in the damping force generating mechanism shown in FIG. 1 when the coil is not energized.

The small-diameter portion 51 of the plunger 50 and the guide hole 43 and ports 44 of the fail-safe valve member 25 constitute a fail-safe valve B. The fail-safe valve B operates as follows. When the relief pressure of the pressure control valve A is being adjusted by moving the plunger 50 backward by supplying a control electric current to the coil 47, as shown in FIG. 3, the ports 44 and the guide hole 43 are communicated with each other with a sufficiently large flow path area. On the other hand, when the electric current supplied to the coil 47 is zero (i.e. less than a predetermined electric current), as shown in FIG. 4, the plunger 50 is moved forward by the spring force of the spring 58 until the retainer 56 comes in contact with the fail-safe valve member 25. Consequently, the small-diameter portion 51 sufficiently restricts the flow path area of the ports 44 (the small-diameter portion 51 may close the ports 44).

In the above-described arrangement, the hydraulic fluid passage 17, the annular hydraulic fluid passage 16, the opening 18, the passage member 22, the hydraulic fluid passage 31, the annular groove 33, the hydraulic fluid passage 32, the annular hydraulic fluid chamber 29 and the hydraulic fluid passage 30 constitute a main hydraulic fluid passage that provides communication between the cylinder upper chamber 2a and the reservoir 4. The fixed orifice 35a, the hydraulic fluid passage 36a, the cut portion 38a, the back-pressure chamber 41, the annular groove 42, the ports 44, the guide hole 43, the communicating passage 52, the hydraulic fluid chamber 48 and the hydraulic fluid passage 48a constitute a sub-hydraulic fluid passage that bypasses the main disk valve 35, which is a pilot-type damping valve.

The operation of the foregoing embodiment will be described below.

During the extension stroke of the piston rod 6, as the piston 5 moves, the check valve 12 for the hydraulic fluid passage 11 of the piston 5 is closed, and the hydraulic fluid in the cylinder upper chamber 2a is pressurized. Consequently, the hydraulic fluid in the cylinder upper chamber 2a flows through the hydraulic fluid passage 17, the annular hydraulic fluid passage 16 and the opening 18 to the passage member 22 of the damping force generating mechanism 19 and further flows through the hydraulic fluid passage 31, the sub-disk valve 34, the fixed orifice 35a of the main disk valve 35, the hydraulic fluid passage 36a of the spacer disk 36 and the cut portion 38a of the plate spring 38 to the back-pressure chamber 41.

Because the ports 44 of the fail-safe valve B are kept open with a sufficiently large flow path area by the supply of a control electric current to the coil 47, the hydraulic fluid in the back-pressure chamber 41 flows through the communicating passage 52. When the pressure at the pressure control valve A reaches a pressure overcoming the force exerted by the coil 47, the plunger 50 is moved forward against the thrust produced by the coil 47, causing the disk valve 55 to lift from the valve seat 49. Consequently, the hydraulic fluid flows through the hydraulic fluid chamber 48, the hydraulic fluid passage 48a, the annular hydraulic fluid chamber 29 and the hydraulic fluid passage 30 to the reservoir 4. At the same time, the disk valve 55 deflects and thus also operates to open the flow path.

When the pressure of the hydraulic fluid flowing through the sub-disk valve 34 reaches the valve opening pressure of the main disk valve 35, the hydraulic fluid opens the main disk valve 35 and flows into the annular groove 33. Then, the hydraulic fluid passes through the hydraulic fluid passage 32 and flows directly into the annular hydraulic fluid chamber 29. It should be noted that an amount of hydraulic fluid corresponding to the movement of the piston 5 flows from the reservoir 4 into the cylinder lower chamber 2b by opening the check valve 14 for the hydraulic fluid passage 13 of the base valve 10.

During the contraction stroke of the piston rod 6, as the piston 5 moves, the check valve 12 for the hydraulic fluid passage 11 of the piston 5 opens, whereas the check valve 14 for the hydraulic fluid passage 13 of the base valve 10 is closed. Consequently, the hydraulic fluid in the cylinder lower chamber 2b flows into the cylinder upper chamber 2a, and an amount of hydraulic fluid corresponding to an amount by which the piston rod 6 enters the cylinder 2 flows from the cylinder upper chamber 2a to the reservoir 4 through a flow path similar to that during the extension stroke.

Thus, during both the extension and contraction strokes of the piston rod 6, before the main disk valve 35 opens (in the low piston speed region), damping force is generated by the sub-disk valve 34, the fixed orifice 35a and the pressure control valve A. The pressure in the back-pressure chamber 41, and hence, damping force, can be controlled directly independently of the piston speed by controlling the control pressure (relief pressure) of the pressure control valve A through the electric current supplied to the coil 47 of the proportional solenoid control part 27. At this time, the pressure in the back-pressure chamber 41 acts in the direction for closing the main disk valve 35. Therefore, the valve opening pressure of the main disk valve 35 is adjusted together with the control pressure of the pressure control valve A. Accordingly, it is possible to control damping force based on the valve opening characteristics of the main disk valve 35 (i.e. damping force in the high piston speed region).

Figure 7:
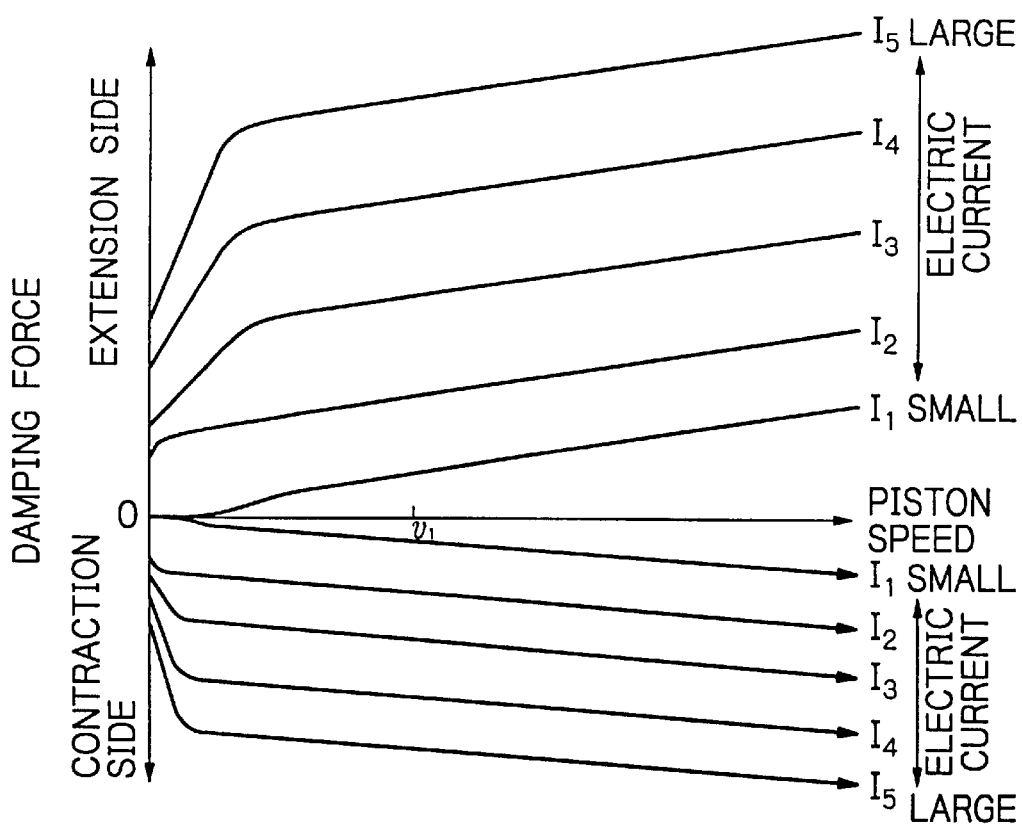
FIG. 7 is a diagram showing damping force characteristics in the control zone of the damping force control type hydraulic shock absorber shown in FIG. 2.

In this way, damping force can be controlled over a piston speed range from the low speed region to the high speed region, and thus the damping force control range can be widened. Because it is possible to obtain appropriate damping force based on the valve characteristics by the pressure control valve A even in the low piston speed region, it is possible to prevent damping force from becoming insufficient in the low piston speed region and also prevent damping force from excessively increasing in the high piston speed region. FIG. 7 shows damping force characteristics in the operable control zone of the damping force control type hydraulic shock absorber 1 (I denotes the electric current supplied to the coil 47; $I_1 \leq I \leq I_5$). In the pressure control valve A (disk valve), the effect of hydraulic fluid viscosity changes on the flow resistance is smaller than in the variable orifice (flow control valve). Therefore, it is possible to obtain damping force that is stable to temperature changes.

When the pressure in the back-pressure chamber 41 rises abruptly in response to an abrupt input due to thrusting-up force applied to the vehicle from the road surface, for example, the disk valve 55 of the pressure control valve A deflects, and the outer peripheral portion of the disk valve 55 lifts from the valve seat 49, thereby allowing the pressure in the back-pressure chamber 41 to be rapidly relieved to the hydraulic fluid chamber 48. Therefore, it is possible to suppress an abrupt rise in damping force and hence possible to improve the ride quality of the vehicle. The disk valve 55 provides a large opening area with respect to the amount of lift in comparison to the conventional poppet valve. Therefore, the amount of movement required for the plunger 50 is smaller than in the case of the conventional poppet valve. Accordingly, the disk valve 55 is excellent in responsivity and not susceptible to frictional resistance.

In addition, the pressure control valve A controls the relief pressure in such a manner that the plunger 50, which is constantly urged in the valve opening direction by the spring 58, is urged in the valve closing direction with thrust produced by supplying an electric current to the coil 47. Therefore, it is possible to minimize thrust that is necessary to produce from the coil 47 when damping force is controlled to the "soft" side. Accordingly, under the normal running conditions of vehicles, where "soft" damping force characteristics are often used, the electric current supplied to the coil 47 can be reduced. Thus, it is possible to reduce the power consumption and also lighten the load on the coil 47.

Figure 8:
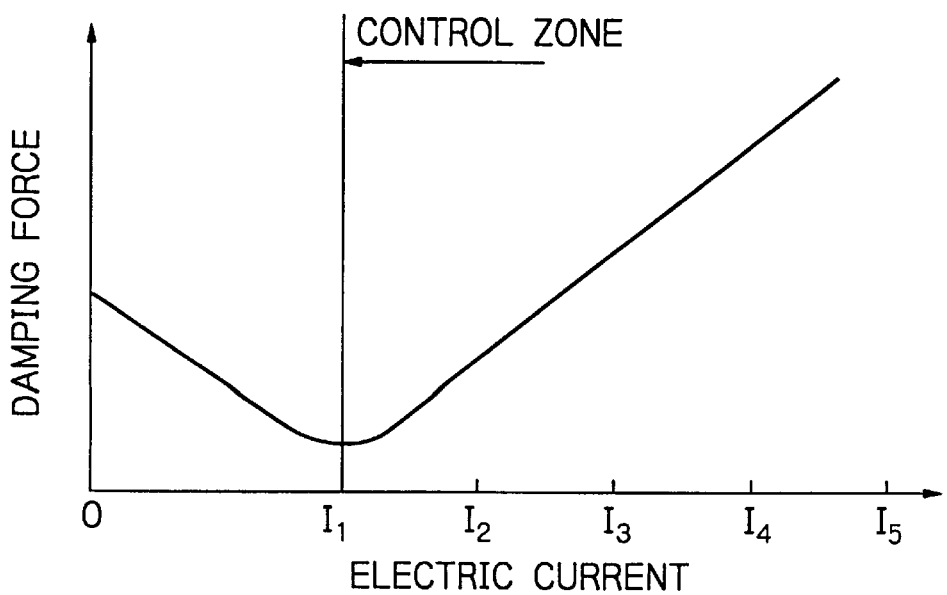
FIG. 8 is a diagram showing the relationship between the electric current supplied to the coil and damping force in a case where the piston speed of the damping force control type hydraulic shock absorber shown in FIG. 2 is fixed.

When the electric current supplied to the coil 47 is zero (i.e. less than a predetermined electric current), as shown in FIG. 4, the plunger 50 is moved forward by the spring force of the spring 58, causing the disk valve 55 to separate from the valve seat 49. Consequently, the pressure control valve A is opened. On the other hand, the fail-safe valve B is approximately closed because the small-diameter portion 51 of the plunger 50 restricts the flow path area of the ports 44. Accordingly, the flow path from the back-pressure chamber 41 to the hydraulic fluid chamber 48, and hence, to the reservoir 4, is restricted to obtain "hard" damping force characteristics. Thus, in a case where it becomes impossible to supply an electric current to the coil 47 owing to a failure in the electric system or the like, the damping force characteristics are fixed to the "hard" side. Therefore, the steering stability of the vehicle can be ensured. FIG. 8 shows the relationship between damping force and the electric current I supplied to the coil 47 in a case where the piston speed v of the damping force control type hydraulic shock absorber 1 is fixed ($v=v_1$).

Next, a second embodiment of the present invention will be described with reference to FIGS. 9 to 11. It should be noted that the second embodiment is generally similar in structure to the above-described first embodiment, exclusive of the structure of the fail-safe valve. Therefore, only the damping force generating mechanism is illustrated in the figures. Portions in the second embodiment that are similar to those in the first embodiment are denoted by the same reference numerals, and only portions in which the second embodiment differs from the first embodiment will be described in detail.

Figure 9:
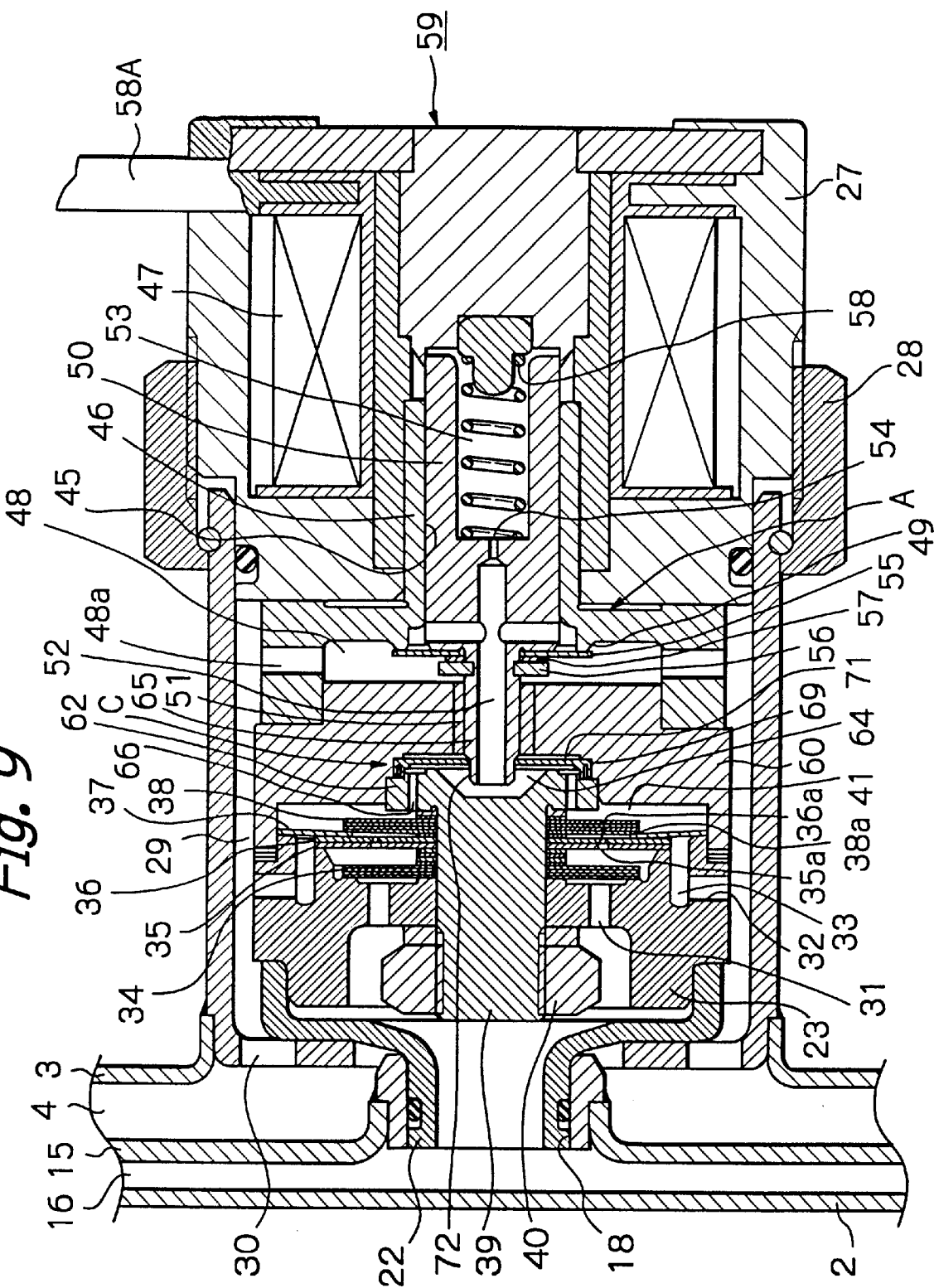
FIG. 9 is an enlarged vertical sectional view showing a damping force generating mechanism of a damping force control type hydraulic shock absorber according to a second embodiment of the present invention.
Figure 10:
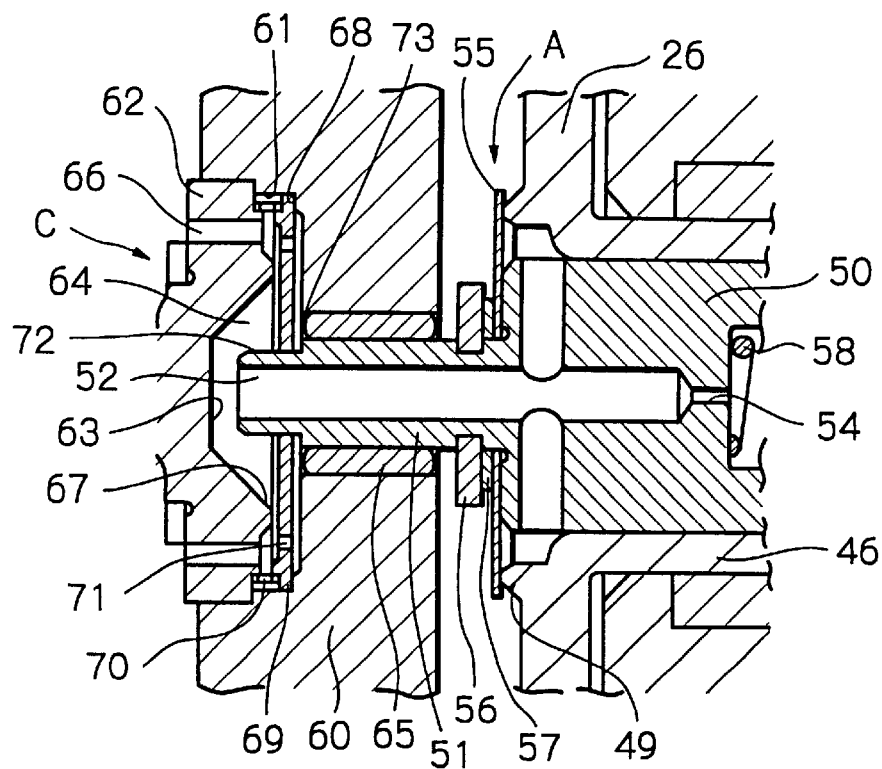
FIG. 10 is an enlarged view of a pressure control valve and fail-safe valve in the damping force generating mechanism shown in FIG. 9 when the coil is energized.

As shown in FIGS. 9 and 10, a damping force generating mechanism 59 according to the second embodiment includes a fail-safe valve member 60 having a cylindrical portion that is integrally formed thereon to abut on the valve member 23, thereby defining the back-pressure chamber 41 and the hydraulic fluid chamber 48. The fail-safe valve member 60 has a circular recess 61 (see FIGS. 10 and 11) formed in the center thereof. The recess 61 is fitted with a flange 62 formed at one end of the pin 39. A valve chamber 64 is formed by the recess 61 and a recess 63 formed in the center of the flange 62. The small-diameter portion 51 of the plunger 50 is inserted into the fail-safe valve member 60 slidably and in a fluid-tight manner through a bush 65. The distal end of the small-diameter portion 51 extends into the recess 63 of the pin 39 so that the communicating passage 52 is communicated with the valve chamber 64. The flange 62 of the pin 39 is provided with a hydraulic fluid passage 66 on the outer peripheral side of the recess 63 to provide communication between the back-pressure chamber 41 and the valve chamber 64.

An annular valve seat 67 projects from the outer periphery of the recess 63 of the pin 39. An annular seat portion 68 projects from the outer periphery of the bottom of the recess 61 of the fail-safe valve member 60. The seat portion 68 has a larger diameter than that of the valve seat 67. A disk-shaped valving element 69 is provided in the valve chamber 64 so as to face both the valve seat 67 and the seat portion 68. The valving element 69 and the valve seat 67 constitute a fail-safe valve C. Normally, the valving element 69 is urged to rest on the seat portion 68. by a spring 70 provided between the valving element 69 and the flange 62 of the pin 39. Thus, the valving element 69 is separate from the valve seat 67, and the fail-safe valve C is in an open state. Consequently, the hydraulic fluid passage 66 and the communicating passage 52 are communicated with each other with a sufficiently large flow path area. The valving element 69 is provided with an axially extending orifice passage 71 between portions of the valving element 69 that rest on the valve seat 67 and the seat portion 68, respectively.

The valving element 69 is slidably fitted with a guide portion 72 formed at the distal end of the small-diameter portion 51 of the plunger 50. The guide portion 72 has a smaller diameter than that of the small-diameter portion 51. When the relief pressure of the pressure control valve A is being adjusted by moving the plunger 50 backward by supplying a control electric current to the coil 47, the guide portion 72 slides relative to the valving element 69. Therefore, the valving element 69 remains resting on the seat portion 68. On the other hand, when the electric current supplied to the coil 47 is zero (i.e. less than a predetermined electric current), as shown in FIG. 11, the plunger 50 is moved forward by the spring force of the spring 58 until a step 73 at the proximal end of the guide portion 72 abuts on the valving element 69 and causes the valving element 69 to rest on the valve seat 67. Thus, the valving element 69 cuts off the communication between the hydraulic fluid passage 66 and the communicating passage 52.

By virtue of the above-described arrangement, normally, the valving element 69 of the fail-safe valve C is kept open by the supply of a control electric current to the coil 47, thereby allowing the hydraulic fluid passage 66 and the communicating passage 52 to be communicated with each other with a sufficiently large flow path area. Therefore, damping force can be controlled according to the control electric current as in the case of the first embodiment.

Figure 11:
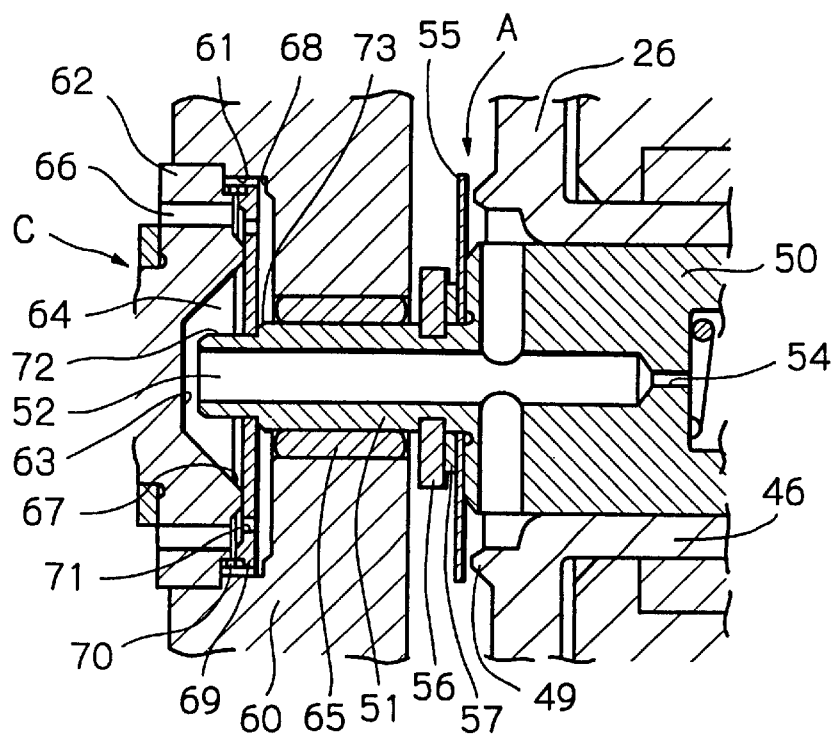
FIG. 11 is an enlarged view of the pressure control valve and fail-safe valve in the damping force generating mechanism shown in FIG. 9 when the coil is not energized.

When the electric current supplied to the coil 47 is zero (i.e. less than a predetermined electric current), as shown in FIG. 11, the plunger 50 is moved forward by the spring force of the spring 58, causing the disk valve 55 to separate from the valve seat 49. Consequently, the pressure control valve A is opened. In the fail-safe valve C, on the other hand, the step 73 of the plunger 50 abuts on the valving element 69 and causes the valving element 69 to rest on the valve seat 67. Thus, the communication between the hydraulic fluid passage 66 and the communicating passage 52 is cut off. Accordingly, the flow path from the back-pressure chamber 41 to the reservoir 4 is restricted, and "hard" damping force characteristics are obtained. Thus, in a case where it becomes impossible to supply an electric current to the coil 47 owing to a failure in the electric system or the like, the damping force characteristics are fixed to the "hard" side, and it is therefore possible to ensure the steering stability of the vehicle. It should be noted that the relationship between the damping force and the electric current I supplied to the coil 47 when the piston speed v is fixed ($v=v_1$) is as shown in FIG. 8 as in the case of the first embodiment.

When the valving element 69 is in the valve open position shown in FIG. 10, where the valving element 69 rests on the seat portion 68, the pressures on both sides of the valving element 69 are allowed to be approximately equal to each other by the orifice passage 71. However, the pressure-receiving area on the seat portion (68) side of the valving element 69 is smaller than that on the other side by an amount corresponding to an area of contact with the seat portion 68. Therefore, the valving element 69 is urged toward the seat portion 68 by the pressure of the hydraulic fluid and thus kept resting on the seat portion 68. Accordingly, the spring force of the spring 70 can be reduced sufficiently.

In addition, once the valving element 69 has rested on the valve seat 67, the pressure on the upstream side, i.e. on the cylinder side, will be higher than that on the downstream side, i.e. on the reservoir side, during the strokes of the piston rod 6. Therefore, the valving element 69 is urged toward the valve seat 67 by the pressure difference and the pressure-receiving area difference due to existence of the engagement between the portion of the valving element 69 and the valve seat 67. Accordingly, even if the plunger 50 moves on account of vibrations or the like, and, consequently, the step 73 separates from the valving element 69, the valving element 69 can be held in the valve closing position. Thus, when the fail-safe valve C is opened, the valving element 69 is urged toward the valve opening position by using the pressure of the hydraulic fluid. When the fail-safe valve C is closed, the valving element 69 is urged toward the valve closing position by also using the pressure of the hydraulic fluid. Accordingly, it is possible to reduce the urging force applied to the valving element 69 by a spring or the like and hence possible to reduce the electric power consumed by the coil 47.

To separate the valving element 69 from the valve seat 67, the piston rod 6 is temporarily stopped to cancel the pressure difference acting on the valving element 69. In this state, the coil 47 is energized to move the plunger 50 backward. By doing so, the valving element 69 can be separated from the valve seat 67 by the spring force of the spring 70. At this time, it is possible to prevent an unstable movement of the valving element 69 in a transient state, e.g. variation in pressure of the hydraulic fluid, by properly setting the flow path area of the orifice passage 71 so that appropriate damping force acts on the movement of the valving element 69.

In the above-described second embodiment, when the fail-safe valve C is closed, the communication between the hydraulic fluid passage 66 and the communicating passage 52 is cut off to obtain "hard" damping force characteristics. In this regard, the "hard" damping force can be set small appropriately by providing the valve seat 67, the valving element 69 or the like with a hydraulic fluid passage that provides communication between the hydraulic fluid passage 66 and the communicating passage 52 with a small flow path area even when the fail-safe valve C is closed.

As has been detailed above, according to the damping force control type hydraulic shock absorber of the present invention, damping force before the pilot-type damping valve opens can be directly controlled by controlling the degree of opening of the valving element with thrust from the solenoid. In addition, the valve opening pressure of the pilot-type damping valve can be controlled by varying the pilot pressure through the pressure control valve. Consequently, the damping force control range can be widened, and it is possible to obtain appropriate damping force based on the valve characteristics by the pressure control valve even in the low piston speed region.

In control of damping force, when the electric current supplied to the solenoid is small, the resulting damping force is small, whereas when the supplied electric current is large, the resulting damping force is large. Therefore, under the normal running conditions of vehicles, where "soft" damping force characteristics are often used, the electric current supplied to the solenoid can be reduced. Accordingly, it is possible to reduce the power consumption and also lighten the load on the solenoid. In addition, when there is no supply of electric current, the fail-safe valve restricts the sub-hydraulic fluid passage to increase the damping force. Therefore, in a case where the solenoid cannot be energized owing to a failure in the electric system or the like, the damping force characteristics are fixed to the "hard" characteristic side, and thus the steering stability of the vehicle can be ensured.

If the valving element of the above-described pressure control valve is a disk valve, an abrupt rise in pressure of the hydraulic fluid can be relieved by deflection of the disk valve. Moreover, damping force that is stable to temperature changes can be obtained. Furthermore, it is possible to absorb an abrupt input due to thrusting-up force applied to the vehicle from the road surface, for example. Therefore, it is possible to suppress an abrupt rise in damping force and hence possible to improve the ride quality of the vehicle.

If the fail-safe valve is so arranged that when the fail-safe valve is opened, the valving element thereof is urged toward the valve opening position by the pressure of the hydraulic fluid, and when the fail-safe valve is closed, the valving element is urged toward the valve closing position by the pressure of the hydraulic fluid, it is possible to reduce the urging force applied to the valving element of the fail-safe valve by a spring or the like and hence possible to reduce the electric power consumed by the solenoid.

What is claimed is:

1. A damping force control type hydraulic shock absorber comprising:

a cylinder having a hydraulic fluid sealed therein;

a piston slidably fitted in said cylinder;

a piston rod connected at one end thereof to said piston, the other end of said piston rod extending to an outside of said cylinder;

a main hydraulic fluid passage and a sub-hydraulic fluid passage which are connected to said cylinder to pass the hydraulic fluid in response to sliding movement of said piston;

a pilot-type damping valve provided in said main hydraulic fluid passage; and a fixed orifice and a pressure control valve which are provided in said sub-hydraulic fluid passage;

wherein a pressure between said fixed orifice and said pressure control valve in said sub-hydraulic fluid passage is used as a pilot pressure of said pilot-type damping valve, and wherein said pressure control valve is a solenoid-controlled valve in which a valving element constantly urged in a valve opening direction by an urging device is urged in a valve closing direction by thrust from a solenoid to control a flow path area of said sub-hydraulic fluid passage by a balance between urging force from said urging device and the thrust from said solenoid, thereby adjusting said pilot pressure, and wherein a fail-safe valve is provided in said sub-hydraulic fluid passage, said fail-safe valve being arranged such that it is opened by thrust from said solenoid, and when the thrust from said solenoid is less than a predetermined level, said fail-safe valve restricts said sub-hydraulic fluid passage by the urging force from said urging device.

2. A damping force control type hydraulic shock absorber according to claim 1, wherein said valving element of said pressure control valve is a disk valve.

3. A damping force control type hydraulic shock absorber according to claim 1, wherein when said fail-safe valve is opened, a valving element of said fail-safe valve is urged toward a valve opening position by a pressure of the hydraulic fluid, and when said fail-safe valve is closed, the valving element of said fail-safe valve is urged toward a valve closing position by the pressure of the hydraulic fluid.

4. A damping force control type hydraulic shock absorber according to claim 2, wherein when said fail-safe valve is opened, a valving element of said fail-safe valve is urged toward a valve opening position by a pressure of the hydraulic fluid, and when said fail-safe valve is closed, the valving element of said fail-safe valve is urged toward a valve closing position by the pressure of the hydraulic fluid.

5. A damping force control type hydraulic shock absorber according to claim 2, wherein a back pressure chamber is formed so that a portion of the back pressure chamber is defined by a valving element of said pilot-type damping valve and said pilot pressure is established in the back pressure chamber and wherein said pressure control valve comprises a pilot valve member having a guide bore and an annular valve seat around said guide bore and a plunger slidably received in said guide bore, said plunger having a communication passage which communicates said back pressure chamber and a space encircled by said annular valve seat, said disk valve of the pressure control valve being mounted on said plunger so that it rests on said annular valve seat when said solenoid operates.

6. A damping force control type hydraulic shock absorber according to claim 5, wherein said fail-safe valve comprises a fail-safe valve member having a guide hole for receiving a portion of said plunger so that said communication passage of the plunger opens to the guide hole and a passage which is communicated with said back pressure chamber and opens to said guide hole, said portion of the plunger being adapted to substantially shut said passage of the fail-safe valve member by advancing in the guide hole by the urging force from said urging device when the thrust from said solenoid is less than said predetermined level.

7. A damping force control type hydraulic shock absorber according to claim 5, wherein said urging device is a spring urging said plunger.

8. A damping force control type hydraulic shock absorber according to claim 6, wherein said urging device is a spring urging said plunger.

9. A damping force control type hydraulic shock absorber according to claim 5, wherein said fail-safe valve comprises a fail-safe valve member having a guide hole through which a portion of said plunger extends and a valving element in the form of a disk valve mounted on said portion of the plunger and wherein there are wall portions which define a first hydraulic fluid chamber on one side of said disk valve and communicated with said back pressure chamber so that the pressure in said first hydraulic fluid chamber urges said disk valve in the same direction as said urging device urges said plunger, a second hydraulic fluid chamber on the other side of said disk valve and an annular valve seat engagable with said disk valve so as to divide said second hydraulic fluid chamber into an outer chamber portion communicated with said back pressure chamber and an inner chamber portion communicated with said communication passage of the plunger, the shape and size of said wall portions being so selected that when said disk valve is separated from said annular valve seat, the force applied to said disk valve by the pressure in said second hydraulic fluid chamber prevails over the force applied to said disk valve by the pressure in said first hydraulic fluid chamber.

10. A damping force control type hydraulic shock absorber according to claim 9, wherein the shape and size of said wall portion are so selected that when said disk valve is seated on said annular valve seat, the force applied to said disk valve by the pressure in said first hydraulic fluid chamber prevails over the forces applied to said disk valve by the pressure in said outer and inner chamber portions of said second hydraulic fluid chamber.

* * * * *